July 10, 1951   R. M. WEBSTER, JR., ET AL   2,560,501
HYDRAULIC STEERING FOR SIX WHEEL BOGIES
Filed May 25, 1950
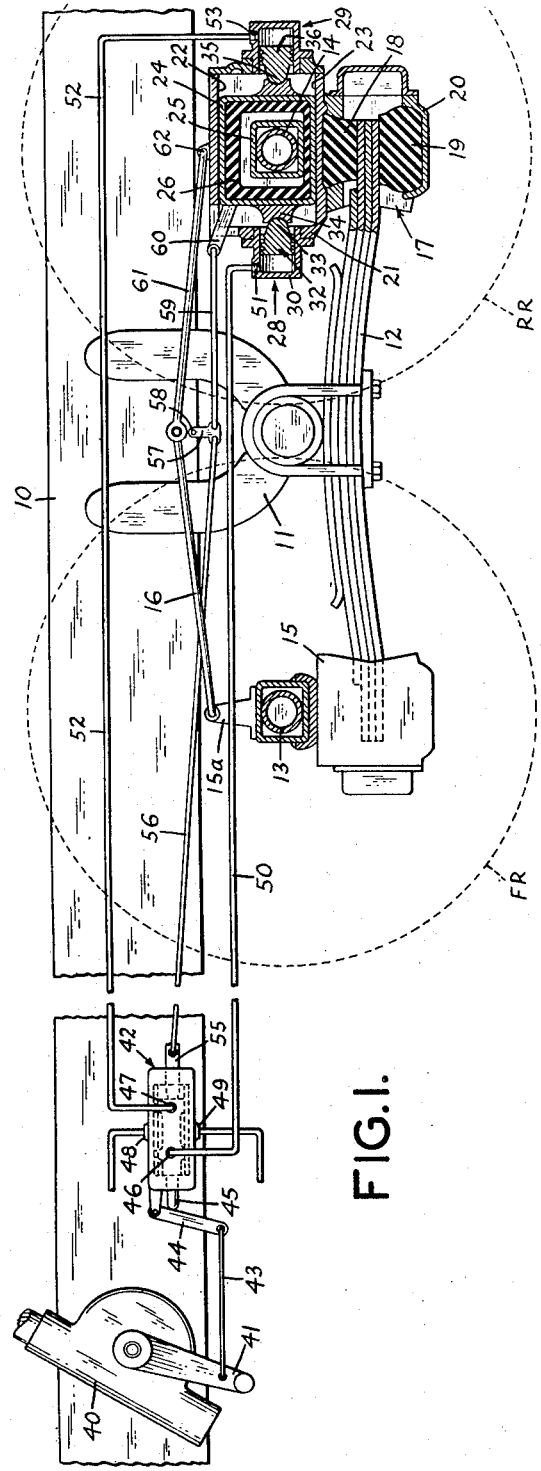
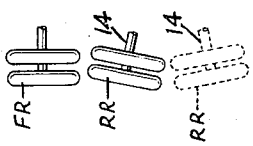
FIG.3.
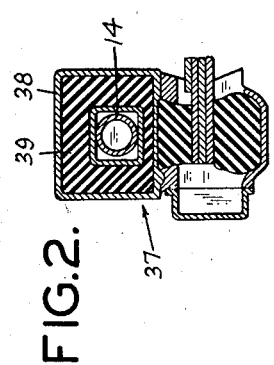
FIG.2.
INVENTORS.
ROBERT M. WEBSTER, JR.
JOHN THOMAS
BY
Campbell, Brumbaugh, Free & Graves
THEIR ATTORNEYS.

Patented July 10, 1951

2,560,501

UNITED STATES PATENT OFFICE 2,560,501

HYDRAULIC STEERING FOR SIX-WHEEL BOGIES

Robert M. Webster, Jr., and John Thomas, Allentown, Pa., assignors to Mack Manufacturing Corporation, New York, N. Y., a corporation of Delaware Application May 25, 1950, Serial No. 164,152

8 Claims. (Cl. 180—79.4)

This invention relates to mechanisms for steering automotive vehicles of the dual axle type such as for example, trucks, buses and the like and it relates more particularly to a mechanism for steering one of the rear axles of such dual rear axle vehicles.

The so-called six wheel or ten wheel truck or bus which has a pair of rear axles, one or both of which are driven by the engine, has always presented a problem in its steering and control. Inasmuch as the dual rear axles of such a vehicle are fixed generally perpendicular to the longitudinal center line of the vehicle, they have a tendency to cause the vehicle to move straight ahead even when the front steering or dirigible wheels are turned to round a curve. As a result, the front wheels and the rear wheels have had a tendency to skid when making a turn producing a phenomenon known as "plowing." This plowing tendency of the wheels results in undesirable wear on the tires and also makes steering difficult. Inasmuch as these disadvantages are well-known, a great deal of thought has been given to mechanisms for steering the wheels or an entire axle of the rear suspension. It has been suggested that one of the rear axles, preferably the rear, rear axle could be provided with a parallelogram steering system much like the system used for steering the front wheels of the vehicle. This expedient has not been very satisfactory because it weakens the steering rear axle due to the presence of king pins and other elements at the load carrying zone of the vehicle. Also it is not very practical to drive the rear steering wheels to supply additional traction.

Another suggestion has been to mount one of the rear axles on a V-shaped radius rod so that the entire axle can swing around the apex of the radius rod to conform to the turning of the front wheels. This arrangement is somewhat better than the parallelogram steering linkage but nevertheless involves rather complicated steering linkages, auxiliary steering mechanisms and shackles between the axle and the spring suspension which has prevented any substantial use of this type of axle suspension.

In accordance with the present invention, we have provided a steerable rear axle for vehicles which may be mounted by a conventional spring suspension and with which steering can be accomplished by shifting one end of the axle and pivoting it about a point adjacent its opposite end at about the point of engagement of the spring suspension with the axle. By shifting of one end of the axle, its inclination with respect to the longitudinal center line is changed so that the wheels track wtih the front steering wheels. Shifting movement of the axle obtained with this system may conform to the turning of the front wheels throughout a portion of their steering movement but need not conform completely to the turning movement for this would require a large shift of the rear axle. However, such complete conformity of turning of the front and rear wheels is unnecessary for most purposes inasmuch as a slight shifting movement overcomes to a very large degree the tendency of the wheels of the vehicle to plow.

The movement of the rear axle may be related to the turning movement of the front wheels by means of a power take off from the front wheel steering mechanism, which, through the medium of a servo-control valve, actuates small hydraulic rams or jacks to change the inclination of the steerable rear axle with respect to the centerline of the vehicle.

The above-described axle mounting enables the use of conventional spring mountings for both the front, rear axle and the rear, rear axle, the only change necessary in these suspensions being the provision of a slide connection between the spring suspension on one side of the vehicle and the shiftable rear axle, and a pivotal or resilient coupling between the opposite end of the rear axle and its corresponding spring suspension.

For a better understanding of the present invention, reference may be had to the accompanying drawing, in which:

Fig. 1 is a view partially in side elevation and partially in section of a typical frame and axle suspension of the kind embodying the present invention with the servo-control valve and the steering mechanism for the front wheels of the vehicle shown diagrammatically thereon;

Fig. 2 is a view in section through the axle and looking toward the opposite side of the vehicle, showing the mounting for the opposite side of the steering axle shown in Fig. 1; and Fig. 3 is a diagrammatic showing of the action of the front wheels and the wheels of the dual rear axle during turning of the vehicle, the movement of the rear, rear wheels being greatly exaggerated to illustrate their action.

Referring now to Fig. 1 of the drawing, a portion of the vehicle is disclosed therein including the frame member 10 having at its opposite sides like depending brackets 11 on each of which is pivotally mounted a leaf spring assembly which acts to suspend the vehicle frame from the front rear axle 13 and a rear, rear axle 14. The spring member 12 being pivotally supported on the bracket 11, permits the axles to move up and down independently so that the wheels thereon can travel over rough or bumpy terrain with a minimum of difficulty. To stabilize the front rear axle 13, it may also be provided with a housing 15 to which the front end of the spring 12 is attached by a rubber shackle and also having an extension 15a connected by means of a radius rod 16 to a fixed point on the vehicle frame 10. It will be understood that the ends of the radius rods 16 are mounted for generally universal movement to permit up and down as well as tilting movement of the axle 13 in a vertical plane.

The rear end of the spring 12 is received in the rubber shackle 17 similar to that referred to above and including a pair of rubber cushioning blocks 18 and 19 mounted in a housing 20 so as to permit relative tilting movement between the housing 20 and the end of the spring 12 and limited endwise movement of the spring 12 relative to the housing 20. The housing 20 also includes a rectangular frame member 21 fixed to the top of the housing 20. The frame member 21 has parallel upper and lower guide surfaces 22 and 23. These guide surfaces receive slidingly a frame-like housing 24 in which the left hand end of the rear axle 14 is received. The rear axle 14 may have a housing 25 thereon which is secured in a rubber sleeve 26 interposed between the inner walls of the frame 24 and the axle housing 25 to permit rocking movement of the axle relative to the frame 24.

The length of the frame member 24 is substantially less than the internal length of the frame 21 so that the inner frame member 24 can move back and forth along the guide surfaces 22 and 23. Normally a movement of about four inches is sufficient.

Movement of the frame 24 and the axle 14 carried thereby is produced by means of a pair of hydraulic jacks or rams 28 and 29. The jack 28 includes a cylinder 30 which is mounted in the end portion of the frame 21 and receives a piston 32 which reciprocates axially of the cylinder. The piston 32 has a rounded or ball-like inner end 33 which engages in a complemental socket member 34 on the front of the frame 24. The jack 29 is similarly constructed and has a ball and socket coupling 35 between the end of the piston 36 and the frame 24. With the above-described construction, by supplying liquid under pressure to the jack 28, the frame 24 and the axle 14 supported therein can be moved rearwardly. By supplying liquid under pressure to the jack 29, the axle 14 may be moved forwardly.

The opposite end of the axle 14 is mounted directly in a shackle housing 37 (Fig. 2) having a rectangular frame 38 for receiving a resilient rubber bushing 39 in which the housing for the right-hand end of the axle 14 is mounted. The shackle and the bushing 39 afford a resilient coupling between the end of the spring on which it is mounted and the axle 14 permitting limited universal pivoting movement of the right-hand end of the axle 14 relative to its supporting spring. Therefore, movement of the axle 14 by means of the jack 28 or the jack 29 causes the entire axle 14 to pivot about the right-hand end where it is supported by the bushing 39 and accordingly changes the inclination of the axle 14 with respect to the centerline vehicle frame, as disclosed in Fig. 3. Fig. 3 in full lines illustrates the positions of the front rear wheels FR and the rear, rear wheels RR on the left-hand side of the vehicle during a turning movement to the left. The movement of the rear, rear axle is greatly exaggerated.

A turning movement to the right will cause the front wheel FL to turn to the dotted line position shown in Fig. 2, while the rear axle 14 will swing also to the exaggerated dotted line position shown in Fig. 2 in substantial conformity to the movement of the front wheel.

The total displacement of the left-hand end of the rear axle 14 is on the order of about four inches so that complete movement to afford a turning arc corresponding to the arc of the front wheels when they are turned for shortest turning radius is not possible but nevertheless the tendency of the wheels to plow is eliminated to a large degree.

The jacks 28 and 29 are energized in response to movement of the steering mechanism as illustrated diagrammatically in Fig. 1. In this figure, the steering mechanism 40 is provided with the usual steering arm 41 coupled either directly to the linkage of the front wheels or through a power assisting mechanism for power steering of the vehicle. The steering arm 41 is connected to a conventional servo-control valve or follow up valve 42 by means of a link 43 which is coupled to a lever 44 on the valve 42. The lever 44 controls the position of the valve plunger 45 of the follow up valve to connect the pressure ports 46 and 47 selectively to the supply port 48 or the return port 49 and disconnect them. Liquid under pressure may be supplied to the port 48 either from a pump driven by the engine or from the pressure accumulator of the hydraulic steering mechanism when power steering is provided for the front wheels. The port 49 is connected to the liquid reservoir which supplies liquid to the pump. The port 46 is connected by means of a conduit 50 to the port 51 of the jack 28 and the port 47 is connected by means of a conduit 52 to the port 53 of the jack 29. Suitable flexible conduits may be used to avoid damage thereto by movement of the axles relative to the frame.

The control valve 42 is so constructed and arranged that when the supply port 48 is connected to the port 46, the pressure port 47 is connected to the return port 49. During straight driving of the vehicle, both of the ports 46 and 47 are disconnected from the supply port 48 and the return port 49 so that the rear axle is, in effect, locked perpendicular to the centerline of the vehicle by the liquid trapped in the jacks 28 and 29. During turning movement to the left, as shown in Fig. 3, the jack 29 is connected to the supply port 48 through the port 47 while the jack 28 is connected to the return port 49 through the port 46.

Inasmuch as the movement of the jacks should be proportional to the movement of the front wheels at least in the early stages of a turning movement, a follow up sleeve 55 is provided in the valve 42 which is controlled by means of a linkage system including the link 56, a lever 57 pivotally mounted at its upper end 58 on the frame 10 on a line passing through the center of pivoting movement of the spring 12 and the radius rods 16 and 61, and a link 59 between the lower end of the lever 57 and a bracket 60 which is fixed to a movable frame 24. The function of the sleeve 55 and the linkage described above is to cause the flow of liquid to the jack to be cut off after the axle has moved a distance proportional to the displacement or turning movement of the front wheels. In this way, within the limits of movement of the left-hand end of the axle 14, it is possible to control the turning movement of the rear axle 14 to correspond to the turning of the front wheels and thereby cause the rear end of the vehicle to track approximately with the front wheels.

Inasmuch as the overall displacement of the rear axle is relatively small along the center line of the vehicle, it is possible to provide a drive connection between the front, rear axle and the rear, rear axle which enables both of the rear axles and the wheels thereon to be driven by the engine. However, if desired, either the front rear axle or the rear, rear axle may be driven independently, leaving the other axle of the pair as a dead weight-supporting axle.

In order to stabilize the rear, rear axle 14 and the housing which supports it, a suitable radius rod connection may be made between the top of the frame 21 and the vehicle frame 10. Such a connection may consist of a radius rod 61 pivotally mounted concentric with the radius rod 16 and also pivotally and rotatably connected to the pivot pin 62 on the top of the frame 21. A similar radius rod is provided on the opposite side of the vehicle frame. This parallelogram suspension prevents fore and aft rocking of the housing 20 and frame 21 while permitting freedom of movement of the axle 14 in a vertical plane to absorb road shock.

It will be understood that other types of spring suspension may be used for supporting the frame from the rear axles and that the shiftable mount of the left-hand end of the rear axle 14 may be incorporated in such modified spring suspensions.

It will be understood further that the sliding connection between the rear axle and its spring connection can be modified in accordance with operating requirements and that a greater or lesser movement of the axle may be arranged as may be desired. Therefore, the form of the invention described above should be considered as illustrative and not as limiting the scope of the following claims.

We claim:

1. A steering system for six wheel vehicle having an axle provided with dirigible wheels controlled by a steering mechanism and a pair of rear axles mounted by a spring suspension on the frame of the vehicle, comprising means connecting one end of one of said axles to said spring suspension for pivoting movement about an axis substantially perpendicular to the vehicle frame, means connecting the other end of said one axle to the spring suspension for movement lengthwise of said frame, power means for moving said other end of said axle lengthwise of said frame, and means responsive to said steering mechanism for actuating said power means to move said axle about said axis to steer the wheels thereon.

2. A steering system for six wheel vehicle having an axle provided with dirigible wheels controlled by a steering mechanism and a pair of rear axles mounted by a spring suspension on the frame of the vehicle, comprising a resilient connection between one end of one of said axles and the spring suspension permitting limited universal movement of the axle about said one end, a sliding connection between the other end of said one axle and said spring suspension permitting movement of said other end lengthwise of said frame, power means for moving said other end of said axle lengthwise of said frame, and means responsive to said steering mechanism for actuating said power means to move said axle about said axis to steer the wheels thereon.

3. A steering system for six wheel vehicle having an axle provided with dirigible wheels controlled by a steering mechanism and a pair of rear axles mounted by a spring suspension on the frame of the vehicle, comprising means connecting one end of one of said axles to said spring suspension for pivoting movement about an axis substantially perpendicular to the vehicle frame, means connecting the other end of said one axle to the spring suspension for movement lengthwise of said frame, hydraulic reciprocating motors carried by said spring suspension adjacent to said other end of said axle for moving the latter lengthwise of said frame, and means responsive to said steering mechanism for actuating said motors selectively to move said other end of said axle to aid said dirigible wheels in steering the vehicle.

4. A steering system for six wheel vehicle having an axle provided with dirigible wheels controlled by a steering mechanism and a pair of rear axles mounted by a spring suspension on the frame of the vehicle, comprising a resilient connection between one end of one of said axles and the spring suspension permitting limited universal movement of the axle about said one end, a sliding connection between the other end of said one axle and said spring suspension permitting movement of said other end lengthwise of said frame, hydraulic reciprocating motors carried by said spring suspension adjacent to said other end of said axle for moving the latter lengthwise of said frame, and means responsive to said steering mechanism for actuating said motors selectively to move said other end of said axle to aid said dirigible wheels in steering the vehicle.

5. The steering system defined in claim 3 in which the means responsive to said steering mechanism comprises a source of liquid under pressure a servo-control valve connected between said source and said hydraulic motors for selectively supplying liquid to and discharging it from said motors, to drive them and means connecting said valve to said steering mechanism to actuate the motors selectively and turn said one axle about said axis in substantial conformity to the steering movement of said dirigible wheels.

6. A system for steering one of a pair of rear axles on a vehicle comprising spring means on opposite sides of said vehicle frame to support the latter on said axles, a resilient shackle connecting said spring means to one of said rear axles adjacent to one of its outer ends to permit limited universal movement of said axle relative to said spring means, a housing mounted on the spring means on the opposite side of said frame, said housing having a pair of guide surfaces therein extending lengthwise of said frame, a slide member mounted on said one of said rear axles adjacent to the opposite outer end thereof and slidable between said guide surfaces, cylinders in said housing at opposite ends of said guide surfaces, pistons reciprocable in said cylinders and connected to said slide member to move it along said guide surfaces, and means to supply liquid under pressure selectively to said cylinders to move said slide member and the axle therein to vary the angular relation between said rear axles thereby to aid in steering the vehicle.

7. The steering system set forth in claim 6 comprising resilient means interposed between said opposite outer end of said one axle and said slide member to permit limited relative movement therebetween.

8. The steering system set forth in claim 6 in which the means to supply liquid to said cylinders comprises a source of liquid under pressure and a control valve to supply liquid to one of said cylinders, selectively and discharge liquid from the other cylinder.

ROBERT M. WEBSTER, Jr.
JOHN THOMAS.

REFERENCES CITED

The following references are of record in the file of this patent:

UNITED STATES PATENTS

| Number | Name | Date |
|---|---|---|
| 1,731,558 | Wright | Oct. 15, 1929 |
| 2,215,981 | Freeman | Sept. 10, 1940 |